July 25, 1972   W. A. HARTMAN, JR., ET AL   3,679,372
OFF-GAS BURNER SYSTEM
Original Filed April 9, 1969   4 Sheets-Sheet 1

INVENTORS:
WILLIAM A. HARTMAN, JR.
MANNY SIEGLER

United States Patent Office

3,679,372
Patented July 25, 1972

---

3,679,372
OFF-GAS BURNER SYSTEM
William A. Hartman, Jr., and Manny Siegler, San Jose,
 Calif., assignors to General Electric Company
Original application Apr. 9, 1969, Ser. No. 814,769, now
 Patent No. 3,598,699, dated Aug. 10, 1971. Divided
 and this application Mar. 6, 1970, Ser. No. 24,953
Int. Cl. F23d 13/16; F23g 7/06
U.S. Cl. 23—277 C                              4 Claims

---

ABSTRACT OF THE DISCLOSURE

A system for burning flammable gas including three porous plugs in series in the off-gas line. The first plug serves as an upstream flame arrestor in case of burner failure. The second porous plug serves as a burner with a flame ignition means adjacent the downstream face of the plug. The third porous plug serves as a downstream flame arrestor and condenser for the water vapor formed in the flame reaction. Each of the porous plugs includes internal cooling means to remove heat. Appropriate temperature sensing means and control means are provided to insure safe, reliable operation.

---

This application is a divisional of patent application Ser. No. 814,769, entitled "Nuclear Reactor Off-Gas Burner System" filed Apr. 9, 1969 by W. A. Hartman, Jr. and M. Siegler, now Pat. No. 3,598,699.

BACKGROUND OF THE INVENTION

Numerous industrial processes produce combustible gases as an undesirable byproduct. These combustible gases may constitute a hazard and often interfere with the processing of other byproduct gases. An example is the hydrogen and oxygen found mixed with the steam in a nuclear reactor steam power plant.

Under present commercial practice, the non-condensable gases which are mixed in the steam are removed in the condenser, held for a suitable period to premit any short-lived fission and activation product gases which may be present to decay to safe levels, then the gases are vented to the atmosphere through a stack. These reactor off-gases primarily consist of air which has leaked into the system through various flanges and fittings, and hydrogen and oxygen produced by radiolytic decomposition of water in the reactor core. In addition, small amounts of radioactive noble gases, such as xenon and krypton are present in the off-gas. In a typical large reactor system, the total off-gas is about 200 cubic feet per minute, of which about 90% is a radiolytically formed stoichiometric mixture of oxygen and hydrogen, about 10% is water vapor and air in-leakage. Also, there are a few cubic centimeters per minute of fission product gases such as xenon and krypton. It is generally necessary to retain the off-gas for about 30 minutes to permit the xenon and krypton isotopes and the short-lived activation products to decay to safe levels before venting the gases to the amosphere. This necessary delay requires that large volumes of gases containing potentially explosive mixtures of hydrogen and oxygen must be stored for this period before venting. Standard practice has been to provide a large volume piping system designed to withstand explosions to hold this gas for the required period. For example, such a hold-up pipe may be a few feet in diameter and extend for several hundred feet. This hold-up system is expensive because of its size and the necessity of an explosion-proof design. Thus, it would be highly desirable to eliminate the hazards and expense resulting from the need to retain large quantities of explosive gases for appreciable periods.

It has been proposed that this volume be reduced by recombining the stoichiometric hydrogen-oxygen content of the off-gas to form water, which would be condensable. This would both greatly reduce the quantity of gas being stored and remove the danger of an explosion. Attempts have been made to use catalytic recombiners in this manner. However, these recombiners have not been entirely successful since they require steam dilution of the hydrogen to a concentration of about 4 percent by volume, superheating of the steam diluted mixture to prevent catalyst poisoning and periodic catalyst replacement because of the accumulative poisoning by water and/or organic materials. Thus, these catalytic recombiners have not been entirely successful in this application which requires the continuous treatment of large volumes of gases.

Recombining of the hydrogen and oxygen in the reactor off-gases is further made difficult by the fact that the gas flow may be continuous or intermittent, may vary somewhat in composition and may have variable velocity though the system.

SUMMARY OF THE INVENTION

It is, therefore, an object of this invention to provide an off-gas handling system which overcomes the above-noted problems.

It is another object of this invention to provide an off-gas handling system which reduces the off-gas volume by recombining hydrogen and oxygen in the off-gas stream.

Still another object of this invention is to provide an off-gas handling system of improved safety and reliability.

Still another object of this invention is to provide an off-gas handling system which is capable of handling a gas stream varying widely in composition and flow characteristics.

The above objects, and others, are accomplished in accordance with this invention by providing a continuous off-gas processing system which utilizes three cooled porous plugs in series in the off-gas line. The first plug serves as an upstream flame arrestor in case of burner failure. The second porous plug serves as a burner with an ignition source adjacent the downstream surface of the burner. The third porous plug serves as a downstream flame arrestor, cooler for the hot gases and condenser for the water vapor formed by burning the hydrogen and oxygen. Porous plug burners are described in further detail in copending U.S. patent application Ser. No. 771,467, filed Oct. 29, 1968, the disclosure of which is incorporated herein by reference. If desired, additional porous plugs may be included upstream and/or downstream of the above-described array, to provide additional safety should any of the primary plugs prove defective.

BRIEF DESCRIPTION OF THE DRAWING

Details of the invention, and of preferred embodiments thereof, will be further understood upon reference to the drawings, wherein.

DETAILED DESCRIPTION OF THE INVENTION

Figure 1:
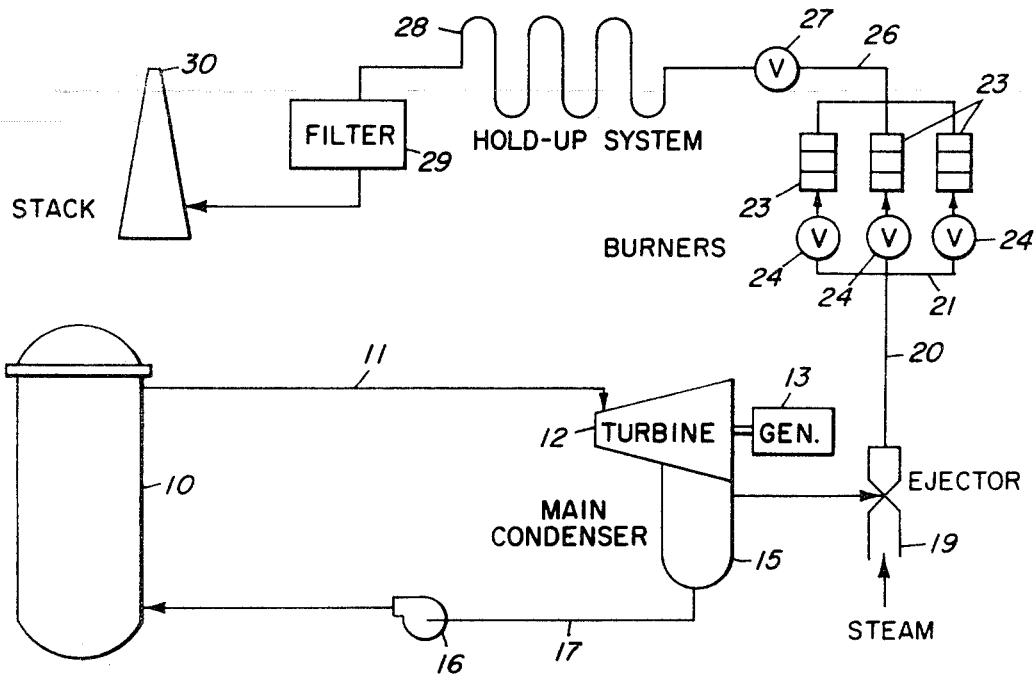
FIG. 1 shows a schematic representation for a nuclear reactor system including the off-gas burner system of this invention.

Referring now to FIG. 1, there is shown, as an example of the use of the present invention in an industrial process producing combustible off-gas, a general schematic representation of a nuclear power generating system including provision for disposing of off-gas from the system. In such a system, steam generated in the reactor 10 passes through a line 11 to a turbine 12 which drives an electrical generator 13. Spent steam from turbine 12 is condensed in main condenser 15. The resulting condensate is pumped back to reactor 10 by pump 16 in line 17.

Non-condensable gases in main condenser 15 are extracted by a steam driven ejector 19. These gases pass through line 20 to manifold 21. Three off-gas burner systems 23 are arranged in parallel. Isolation valves 24 are provided so that each burner 23 can be isolated from the system. Burners 23 are preferably sized so that the system can be operated with one burner set closed off for replacement or repair. The off-gases, greatly reduced in volume, leave the burner array and pass through line 26 and shut off valve 27 to a hold up system 28.

Hold up system 28 contains sufficient volume so that incoming off-gas has a sufficient residence time in the system that short-lived radioactive isotopes decay. From the hold up system the gases pass through an absolute filter 29 and then are vented to the atmosphere through a stack 30. Hold up system 28 can be much smaller than presently used systems which must provide temporary storage volume for the large quantities of oxygen and hydrogen in the off-gas leaving the main condenser. Also, hold up system 28 need not be of explosion-proof construction since the explosive stoichiometric mixture of oxygen and hydrogen has been eliminated in the burner system.

Figure 2:
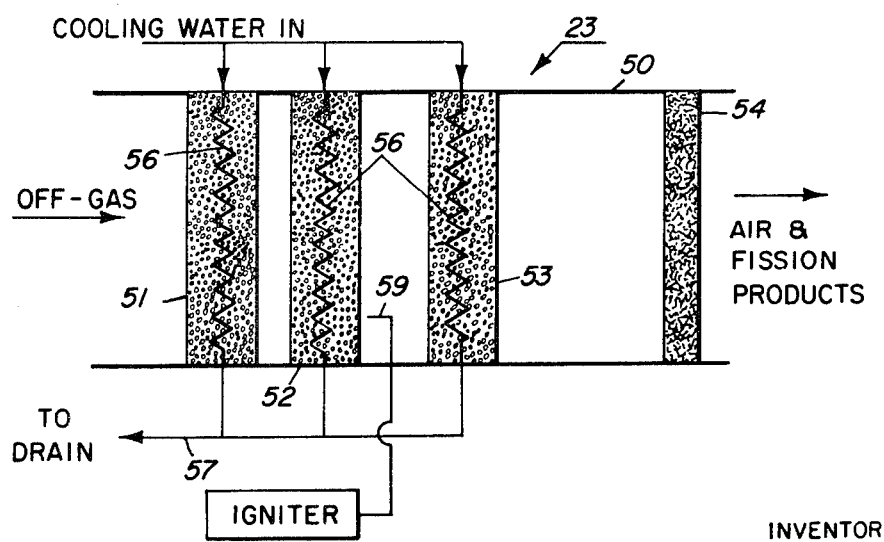
FIG. 2 shows a schematic section through an off-gas burner system according to this invention.

A typical burner set 23 is shown schematically in FIG. 2. Three porous plugs are installed within a conduit 50. As seen in FIG. 2, off-gas enters conduit 50 the left-hand side and exits at the righthand side. The porous plugs include an upstream flame arresting plug 51, a porous plug burner 52 downstream of plug 51 and a downstream flame arresting plug 53. Downstream porous plug 53 may also serve to cool reaction product gases and to condense water vapour generated in the flame reaction. In addition, a further downstream condenser 54 may be provided to aid in condensing the remaining water vapor in the exiting gas stream. Thus, the entering off-gas which may typically include about 60% hydrogen, 30% oxygen and 10% air plus about $10^{-6}\%$ radioactive gaseous isotopes, leaves as a mixture of air and the radioactive isotopes.

The porous plugs 51, 52 and 53 are preferably made of sintered metal, such as copper particles in the size range of from about 1 to about 200 microns. The particles are sintered together to form a plate having continuous interconnected voids throughout the plate. Typically, the pressure drop through a 0.5 inch thick plug is about 0.6 p.s.i. The pressure drop will vary as a function of the velocity of the off-gas flow. For plug burners about ½ inch thick, the pressure drop is about 0.03 p.s.i. per centimeter second of gas flowing under a pressure of about 1 atmosphere. The porous plug units may be manufactured by any conventional technique. Preferably copper cooling tubes are embedded in the plugs to permit the circulation of cooling water therethrough during operation. Typically, porous plugs may be produced from oxygen-free copper particles with copper cooling tubes embedded therein in a graphite mold by sintering the particles during the application of a small pressure (generally less than about 2 p.s.i.) thereto. The extent of pressure application determines the void content and, therefore, the strength of the porous body. While the porous plug bodies may consist of any suitable material, copper and silver are preferred since they have high thermal conductivity and are resistant to heat and oxidation. While any suitable thickness may be used, it is preferred that the plugs have a thickness of from about ⅜ to about ½ inch. Substantially thinner plugs tend to lack strength, and produce non-uniform burning, while substantially thicker plugs tend to be subject to undesirably high pressure drop. Preferably, the cooling tubes are arranged about ⅛ inch below the surface of the plug. Too great thickness of porous plug material over the cooling tubes may result in thermal cracking of the plug. The off-gas being burned should contain at least 4% hydrogen in order to support combustion. Preferably, the gas will include at least 10% hydrogen in air. Thus, this system works very effectively with the typical reactor off-gas mixture which contains about 60% hydrogen.

The cooling fluid, which is preferably water, is introduced into a network or tubes 56 embedded within each of porous plugs 51, 52 and 53. Cooling water leaving the porous plugs pass through line 57 to a drain or cooling tower.

In operation, a continuous flame is maintained on the downstream surface of plug 52. This flame is ignited through means of an ignitor 58 which operates an ignition means 59, such as a spark plug, adjacent the downstream face of plug 52.

In normal operation, ignition means 59 maintains a continuous flame on the downstream surface of plug 52. Water generated by the recombination of hydrogen and oxygen is condensed on downstream plug 53 and condenser 54 and drained through any suitable drain means (not shown). In the event that the flame should go out temporarily, and then be re-established, the space between plugs 52 and 53 is sufficiently small to prevent damage due to explosive ignition of gases between the plugs. Similary, should a crack or other defect develop in plug 52 so that the flame can traverse plug 52 and reach the upstream face thereof, the space between plug 51 and plug 52 is sufficiently small that explosion of gases therebetween will not damage the device. In fact, it has been found that the flame front merely moves to the downstream surface of plug 51 and continues to recombine the hydrogen and oxygen at that point. Thermocouples (not shown) measuring temperature difference across the cooling loop of each of the porous plugs will indicate whether the flame is burning, and the location of the flame front. In normal operation, plug 52 will be at the highest temperature of the three plugs. Should the flame front pass through a defect in plug 52 and establish itself on the downstream surface of plug 51, the temperature of plug 51 would rise and that of plug 52 would drop. Any conventional alarm system may be activated by these temperature changes. While this situation is not dangerous, it would be desirable that the corresponding isolation valve 24 in the overall burner system be closed and the defective porous plug be replaced.

Figure 4:
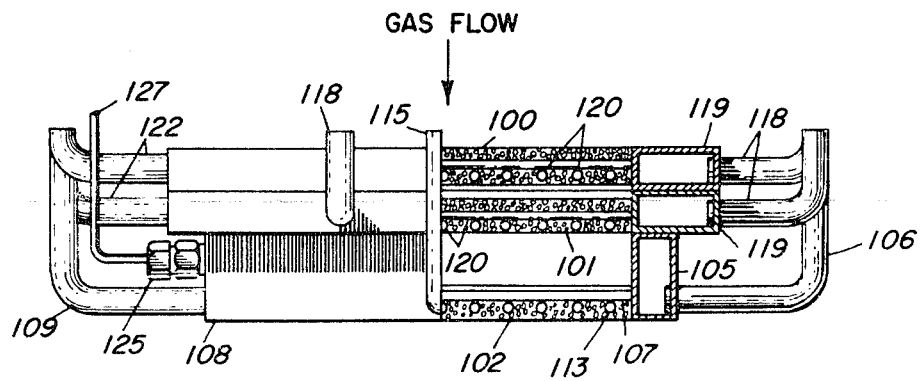
FIG. 4 shows a sectional view of the burner system shown in FIG. 3, taken on line 4—4 in FIG. 3.
Figure 3:
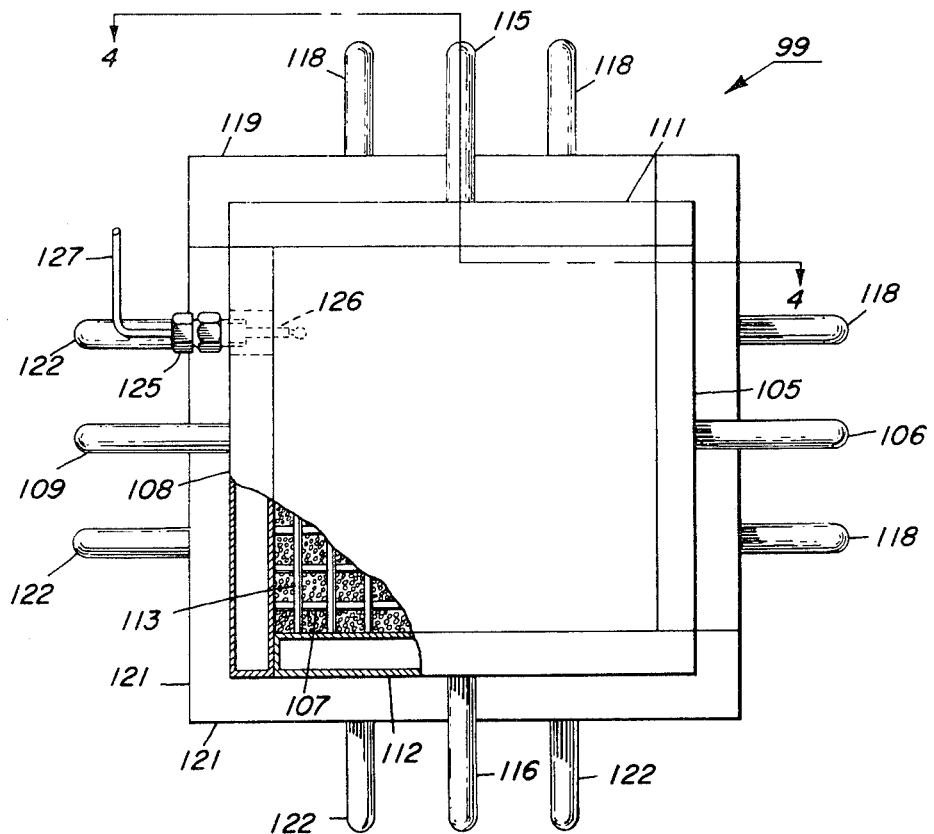
FIG. 3 shows a plan view of a preferred embodiment of the burner system of this invention.

FIGS. 3 and 4 show a preferred embodiment of the porous plug off-gas burner system of this invention. FIG. 3 shows a plan view, with a portion partially cut away to show the cooling tubes within the porous plug. FIG. 4 shows an elevation view partially in section to show the multiple plug arrangement.

As seen in these figures, the porous plug set generally designated 99 includes an upstream flame arrestor plug 100, a burner plug 101 and a downstream flame arrestor and condenser plug 102. As seen in FIG. 4, the off-gas passes downwardly through the plug array. Rectangular tubes are secured to the perimeter of the porous plugs both to serve as manifolds for admitting and removing cooling water and to support the plugs in the desired spaced relationship. The arrangement of this manifold can most clearly be seen with respect to downstream plug 102. As seen in FIG. 3, cooling water is admitted to manifold 105 through a cooling water admission pipe 106. Manifold 105 extends only along one side of porous plug 102 and is closed at the ends. The plurality of thin copper tubes 107 enbedded in porous plug 102 extend from manifold 105 to coolant exit manifold 108. Manifold 108 extends along one edge of porous plug 102 in a manner similar to manifold 105. Cooling water introduced through pipe 106 enters manifold 105 from which it flows through the tubes 107 to exit manifold 108 and then is passed to a cooling tower or drain through drain pipe 109. Similarly, admission manifold 111 and exit manifold 112 are arranged along the other two edges of porous plug 102. An additional set of cooling tubes 113 extend in fluid flow relationship from manifold 111 to manifold 112. Cooling water entering through inlet pipe 115 passes through manifold 111 and cooling tubes 113 to outlet manifold 112 from which it passes through drain pipe 116 to a drain. The crossed sets of cooling tubes are a preferred arrangement, since they add mechanical strength to the plug and give added safety, due to the use of two independent cooling loops.

Porous plugs 100 and 101 are cooled in a similar manner, with cooling water entering through inlet pipes 118 to inlet manifolds 119, passing through cooling tubes 120 to the outlet manifolds 121 and finally to a drain through drain pipes 122. The burners can be secured together by any conventional means, such as by welding or brazing the manifold tubes together or sealing them together with any conventional sealant. The space between plug 100 and plug 101 is sized to prevent a destructive explosion should the flame from the surface of plug 101 pass through a defect and reach this space. Similarly, the space between plug 101 and plug 102 is sized to prevent a destructive explosion should the flame temporarily fail and then be re-ignited.

Figure 5:
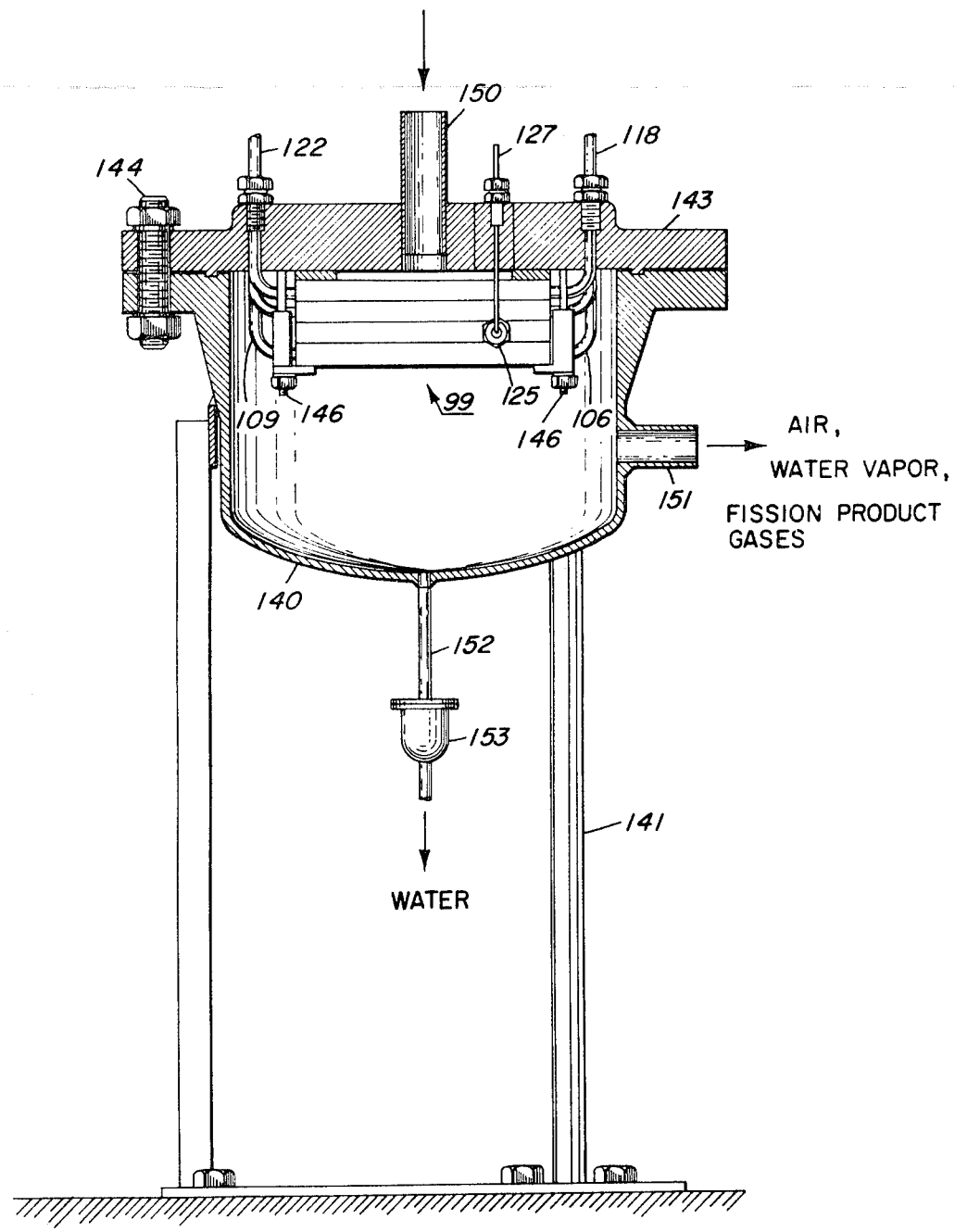
FIG. 5 shows a vertical section through a housing for the burner system of FIG. 3.

The flame is maintained on the lower surface of plug 101 (as seen in FIG. 4) by an ignitor which includes an ignition device 125 which may typically include a conventional spark plug 126 such as is shown in broken lines in FIG. 3. Power to generate the spark may be developed in any conventional power supply (not shown) with the current passing to the spark plug 126 through line 127. FIG. 5 shows a vertical section through a housing and support structure which is especially useful with the burner assembly shown in FIGS. 3 and 4. The burner assembly 99 is contained within a vessel 140 which is supported by a plurality of legs 141. Vessel 140 is closed by a flange 143 which is secured to the vessel by a plurality of bolts 144. Burner assembly 99 is held in tight engagement with flange 143 by means of a plurality of clamps 146. Cooling water inlet pipes 106, 115 and 118 pass through flange 143, as do coolant water drain pipes 109, 116 and 122. The wire 127 to ignitor 125 also passes through flange 143. The off-gases from the reactor enter vessel 141 through pipe 150 in flange 143. After the gases have passed through the burner assembly, and substantially all of the hydrogen has been burned, producing water, the remaining gases leave vessel 140 through outlet pipe 151. A large part of the water vapor produced condenses on the downstream burner 102 and collects in the lower part of vessel 140. The collected water is drained through pipe 152 and water trap 153.

As can be seen, the burner assembly in the housing shown in FIG. 5 is especially convenient and effective. A plurality of such assemblies may be operated in parallel, so that should a defect appear in one burner assembly, the individual housing may be isolated for repair. The burner assembly is readily accessible for inspection and repair. If desired, a plurality of thermocouples may be inserted in the cooling system of various porous plugs to continuously monitor conditions therein and signal unusual conditions.

Figure 6:
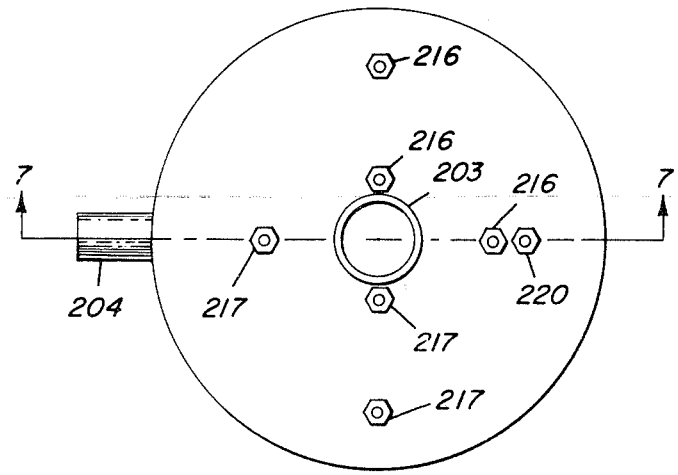
FIG. 6 shows a plan view of an alternative embodiment of the burner system of this invention.
Figure 7:
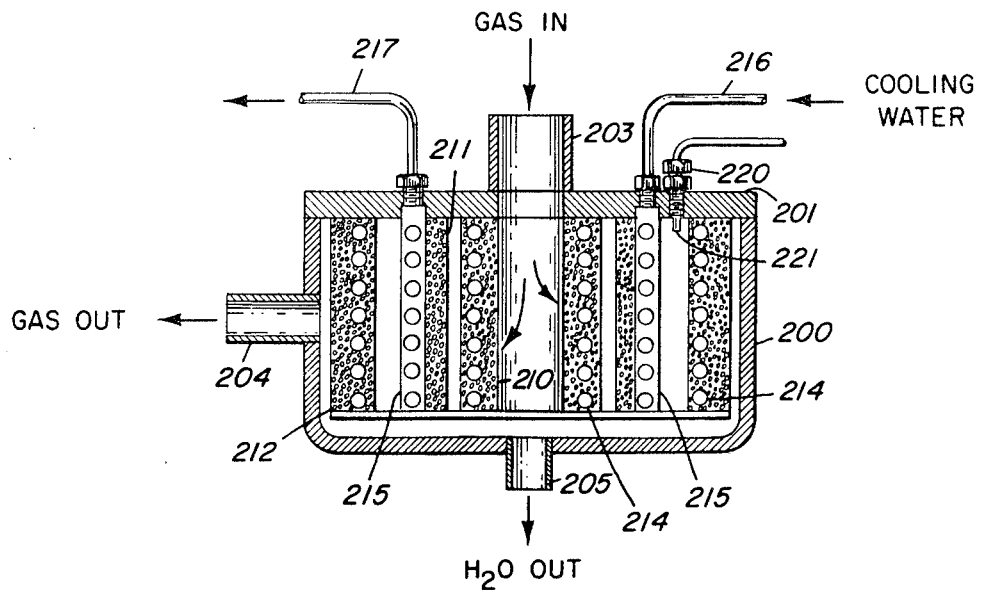
FIG. 7 shows a vertical section through the burner system shown in FIG. 6, taken on line 7—7 in FIG. 6.

An alternative embodiment of an off-gas burner system according to this invention is shown in FIGS. 6 and 7. In this embodiment, the porous plugs are generally toroidal in shape with a ring broken by the insertion of manifolds for the introduction and removal of cooling water. The burner array is supported within a vessel 200 which is closed at the top by a flange 201. The reactor off-gas enters through a pipe 203, passes outwardly through the burner array, and exits through outlet pipe 204. Condensed water vapor passing outwardly through the burner array collects in the lower portion of vessel 201 and is drained through pipe 205. The innermost burner ring 210 acts as an upstream flame arrestor as described above. The next porous plug ring 211 acts as the burner. The outer porous burner ring 212 acts as a downstream flame arrestor and to condense water vapor produced in the flame reaction. Cooling water tubes 214 are embedded within each porous plug. A pair of manifolds 215 are inserted within each porous burner ring at opposite sides thereof. Thus, cooling water entering one manifold will pass through inlet pipe 216, then will pass in both directions around the ring through tubes 214 to the outlet manifold from which it will be drained through drain pipe 217. An ignition means 220, which may include a conventional spark plug 221, is provided to maintain the flame on the downstream surface of burner porous plug 211.

The system shown in the embodiment of FIGS. 6 and 7 is highly compact and effective. A plurality of such modules may be arranged to operate in parallel so that repair or replacement of porous plugs may be accomplished by isolating individual modules from the overall system.

Further details of a specific preferred embodiment of this invention will be understood upon reference to the following example. All parts and percentages are by weight unless otherwise indicated.

EXAMPLE

An assembly of porous plugs such as shown in FIGS. 3 through 5 is first assembled. Each porous plug consists of a 9 inch by 9 inch module with 36⅛-inch copper cooling tubes brazed to a copper frame. The assembly of frame and cooling tubes is mounted on a graphite block and about 1½ inch of cut copper wire having an average diameter of about 65–100 mesh is added. The entire assembly is placed in a metal retort with a 90% hydrogen, 10% nitrogen atmosphere. The assembly is maintained at about 750° C. for about 15 minutes. The copper frame consists of rectangular wave guide tubing. Three of these porous plugs are then assembled as shown in FIGS. 3 through 5. Cooling water at an inlet temperature of about 50° F. is circulated through the cooling tubes at about 6 gallons per minute. A stoichiometric mixture of hydrogen and oxygen is flowed through the burner assembly at a flow rate of about 20 cubic feet per minute. Pressure drop through each porous plug is found to be about 0.4 p.s.i. The gas is ignited with a high voltage spark. The spark is necessary for ignition only since the flame is thereafter self-supporting. The burner is operated for about 2100 hours through about 50 cycles of startup and shutdown. The outlet cooling water temperature is found to be about 112° F. About 99.9% of the gaseous hydrogen is found to have been converted to water. At the completion of the tests the burners are disassembled and examined. The burners appear to remain structurally sound, with only very slight surface cracking and slight oxidation of the surface.

Although specific arrangements and proportions have been described in the above description of preferred embodiments, other suitable arrangements and components may be used as indicated above, with similar results.

Other modifications and ramifications of the present invention will occur to those skilled in the art upon reading the present disclosure. These are intended to be included within the scope of this invention.

We claim:
1. An off-gas burner system comprising a conduit for conducting flow of said off-gas therethrough and within said conduit:
   (a) a first porous plug for passing gases and for preventing propagation of flame therethrough extending across said conduit; plug cooling means including means to pass a coolant through said first plug in indirect heat transfer relationship with said first plug and with gases passing through said first plug;

(b) ignition means adjacent the downstream face of said first porous plug for igniting flammable gases flowing through said first plug at the surface thereof;

(c) a second porous plug for passing gases and for preventing propagation of flame therethrough extending across said conduit upstream of said first porous plug, said second porous plug preventing passage of a flame upstream through said conduit in the event of failure of said first porous plug; and (d) a third porous plug for passing gases and for preventing propagation of flame therethrough extending across said conduit downstream of said first porous plug; plug cooling means including means to pass a coolant through said third plug in indirect heat transfer relationship with said third plug and with gases passing through said third plug, said third porous plug preventing passage of a flame downstream through said conduit in the event of failure of said first porous plug.

2. The burner system according to claim 1 further including water vapor condensing means and water drain means downstream of said third porous plug.

3. The burner system according to claim 1 wherein said second plug is spaced from said first plug from about 0.25 to about 0.5 inch and said third plug is spaced from said first plug from about 0.5 to about 0.75 inch.

4. The burner system according to claim 1 wherein each of said plug cooling means includes at least one coolant innlet manifold, at least one coolant outlet manifold, and a plurality of tubes embedded in said porous plug and extending in fluid flow relationship from said inlet manifold to said outlet manifold and means to introduce coolant into said inlet manifold and to drain heated coolant from said outlet manifold.

References Cited

UNITED STATES PATENTS

| | | | |
|---|---|---|---|
| 3,228,755 | 1/1966 | Lottinville | 23—277 C |
| 2,306,011 | 12/1942 | Burk et al. | 23—288 L |
| 1,893,372 | 1/1933 | Kryzanowsky | 23—288 L |
| 3,132,473 | 5/1964 | Hass | 23—288 F |

JAMES H. TAYMAN, Jr., Primary Examiner

U.S. Cl. X.R.

23—288 F, 2 C; 48—192; 176—37; 431—326, 328, 329